United States Patent [19]

Reynolds et al.

[11] Patent Number: 5,784,549
[45] Date of Patent: *Jul. 21, 1998

[54] REDUCED OR FAIL-SAFE BOOTSTRAPPING OF A SYSTEM HAVING A GRAPHICAL USER INTERFACE

[75] Inventors: Brian Alan Reynolds, Redmond; Pierre-Yves Santerre; Darryl S. Richman, both of Bellevue; Ralph Allen Lipe, Woodinville; Robert Matthew McKaughan, Redmond, all of Wash.

[73] Assignee: Microsoft Corporation, Redmond, Wash.

[*] Notice: The term of this patent shall not extend beyond the expiration date of Pat. No. 5,627,964.

[21] Appl. No.: 796,130

[22] Filed: Feb. 6, 1997

Related U.S. Application Data

[63] Continuation of Ser. No. 355,074, Dec. 13, 1994, Pat. No. 5,627,964.

[51] Int. Cl.⁶ ........................................... G06F 11/34
[52] U.S. Cl. ........................ 395/182.22; 395/185.01
[58] Field of Search ........................ 395/121, 182.04, 395/182.13, 184.01, 185.01, 180, 183.12, 182.22; 364/800, 802

[56] References Cited

U.S. PATENT DOCUMENTS

| | | |
|---|---|---|
| 5,063,499 | 11/1991 | Garber .......................... 395/500 |
| 5,142,680 | 8/1992 | Ottman et al. ................ 395/700 |
| 5,274,819 | 12/1993 | Bloomfield-Brown ........ 395/700 |
| 5,446,898 | 8/1995 | Bealkowski et al. ......... 395/700 |
| 5,463,766 | 10/1995 | Schieve et al. ............... 395/650 |

*Primary Examiner*—Albert Decady
*Attorney, Agent, or Firm*—Seed and Berry LLP

[57] ABSTRACT

A method and system are disclosed for invoking a limited or "fail-safe" functionality from a computer system having a graphical user interface (GUI). In one aspect, a computer operating system having GUI functionality can be activated with two different sets of GUI features. Normally, the operating system provides a full complement of GUI features. Alternatively, the operating system provides a more limited set of GUI features. The operating system invokes the limited set of GUI features either in response to a user command, such as a keyboard function key pressed during the bootstrap loading sequence of the operating system, or automatically in response to a failure of an attempt by the computer system to load the normal complement of GUI functions. With the limited set of GUI features, the user of the computer can take advantage of the power of graphical user interfaces even when the computer system is not operating normally. For example, the user can run graphically based diagnostic and repair programs from the "fail-safe" mode. The invention finds application in stand-alone and networked computer systems and, in particular, in systems that store the bulk of the operating system software on a remote server accessible only by network.

12 Claims, 9 Drawing Sheets

REDUCED OR FAIL-SAFE BOOTSTRAPPING OF A SYSTEM HAVING A GRAPHICAL USER INTERFACE

CROSS-REFERENCE TO RELATED APPLICATION

This application is a continuation of Ser. No. 08/355,074, filed Dec. 13, 1994, now U.S. Pat. No. 5,627,964.

TECHNICAL FIELD

The present invention relates to computer operating systems, and more particularly to computer operating systems supporting graphical user interfaces.

BACKGROUND OF THE INVENTION

The incorporation of graphical user interface (GUI) technology in operating systems for computers, in particular personal computers and workstations, is well known. Examples of GUI-based operating systems include the Windows™ version 3.1 user interface running in conjunction with the MS DOS operating system for IBM PC and compatible personal computers (Microsoft Corp., Redmond, Wash.); and the Windows NT™ operating system (Microsoft Corp., Redmond, Wash.), which is portable to various kinds of computer systems.

GUI-based operating systems represent a welcome advance over older, character-based operating systems. Typically, they are easier to learn, more powerful, and more "user-friendly" than their character-based predecessors.

Unfortunately, with known GUI-based operating systems, the power of GUI technology is sometimes least available when it is most needed. An example illustrates: Suppose that a computer user decides to enhance the computer system by installing a new peripheral device. The user plugs in the peripheral device according to the manufacturer's instructions, turns on the computer's power switch, and installs driver software for the peripheral by running an installation program on a floppy disk supplied by the manufacturer. The user expects that the next time the computer is used, the new peripheral will be fully operational. Hoping for this outcome, the user turns off the computer, then turns it back on, and receives an unpleasant surprise as the system promptly crashes. A fatal error occurs that prevents the computer from successfully loading ("bootstrapping") the operating system or, alternatively, from executing the operating system once loaded. The user, who is determined to get the new peripheral to work, rechecks the connections and hardware settings, and tries again. Once again, the system fails.

Now the user would like to determine the exact source of the problem and, if possible, to fix it. In particular, the user would like to determine whether the problem has to do with the interaction between the new peripheral and the computer, an interaction controlled by the driver software. Possibly the driver software is not properly configured for the user's particular system. However, to run the repair programs needed to remove the installed driver software or modify its configuration, the user must first somehow bypass the improperly configured driver software.

To coax the computer into working properly, the user dusts off a well-worn floppy disk that contains an old-style character-based operating system. The user does not ordinarily run this obsolete operating system and, perhaps, has even forgotten most of its commands. Still, it is the most promising alternative at this point.

The user inserts the floppy disk into the floppy drive, turns on the computer, and the character-based operating system loads successfully. The user can now run repair programs—but only so long as they are compatible with the old character-based operating system. It is not possible to run a GUI-based repair program from within the character-based operating system, and so the benefits of GUI performance are unavailable to the user as he or she faces the potentially difficult tasks of debugging and repair.

The foregoing situation is by no means unusual. Similar problems can occur in other instances, for example when a user wishes to install a new GUI-based operating system for the first time or to connect a computer to an untested network. To diagnose and debug the problems that inevitably arise, the user can end up resorting to the antiquated technology of the character-based user interface.

SUMMARY OF THE INVENTION

The invention overcomes these limitations of known systems by allowing the user to repair a GUI-based operating system from within the very same operating system. The invention provides automatic failure recovery through a special "fail-safe" mode of the GUI-based operating system. In this mode, small subset (or possibly, a slightly augmented small subset) of the GUI-based operating system is enabled. This subset provides a familiar framework within which the user can fix the problems that prevent the full system from working properly.

According to the invention, the fail-safe mode of the operating system provides GUI capabilities and, in particular, provides many of the same graphical tools as are provided by the normal mode of the operating system. In effect, the subset provides a limited or provisional GUI-based operating system that gives the user the core capabilities of the normal GUI-based operating system. With it, the user can take advantage of the power of GUI technology even when running diagnostic and repair programs. The limited operating system can be selected in lieu of the normal operating system either automatically by the computer (for instance, upon failure of the regular operating system to load normally) or manually by the user (for instance, responsively to a command from a keyboard or other input device). Moreover, it can be used in a networked setting in which the bulk of the operating system code, including much of the subset used for the limited version, is resident on a remote server or other device accessible to the computer only via a local-area or wide-area network (LAN or WAN).

The invention provides great convenience for the user, who can take advantage of familiar graphical software tools and procedures to diagnose and repair the system. Further, the invention provides flexibility, in that the user can run many other applications programs, in addition to diagnostic and repair programs, all from within the subset of capabilities provided by the fail-safe mode of the operating system.

In one aspect, the invention provides a method for operating a computer system in a failure recovery mode. A processor attempts to establish a normal mode of operation of the system that provides the system with a first set of graphical user interface capabilities by loading a first configuration of operating system software for execution. Responsively to a failure of this attempt, the processor automatically decides to attempt to establish a failure-recovery mode of operation of the system in lieu of the normal mode. The failure-recovery mode provides a second set of graphical user interface capabilities that includes a subset of the first set of graphical user interface capabilities. The processor establishes the failure-recovery mode by loading a second configuration of the operating system software for execution. The processor executes the software of the second configuration to provide the system with a graphical user interface capability of the second set.

The invention will be better understood with reference to the drawings and detailed description below.

DETAILED DESCRIPTION OF THE INVENTION

Overview

The present invention provides a method and system for automatically invoking a limited or "fail-safe" functionality from a computer system having a graphical user interface (GUI), such as a personal computer, workstation, etc. In a specific embodiment of the invention, an operating system having GUI functionality can be activated with two (or more) different sets of GUI features. Normally, a full complement of GUI features is provided. This feature set can be customized by the user to take fullest advantage of the user's particular computer system and its capabilities. Alternatively, a smaller, more limited set of GUI features can be provided. The smaller set can be invoked either in response to a user command, e.g., a keyboard function key pressed during the bootstrap loading sequence of the operating system, or automatically in response to a failure in an attempt by the system to load the normal complement of GUI functions. The smaller feature set is built into the operating system and ordinarily cannot be customized.

The limited set of GUI features allows the user to take advantage of the power of graphical user interfaces even when the system is not operating normally. Thus, for example, the user can run diagnostic tools, debuggers, and repair programs that are graphically based and are therefore easier and more intuitive to use than their character-based predecessors. Moreover, the fail-safe mode of the operating system is just that—a mode of the same operating system to which the user is already accustomed. The user need not learn a new set of commands or interaction strategies in order to immediately and effectively begin using the computer in the fail-safe mode, whether to attempt to solve the problems that are preventing normal operation or simply to run other application programs (e.g., word processors, spreadsheets, graphics programs, etc.) while awaiting help from another more experienced user or a systems programmer. Although the fail-safe mode can, for example, limit the user's choice of display fonts or printouts, it nevertheless lets the user get work done.

An Embodiment on a Stand-Alone Computer

Figure 1:
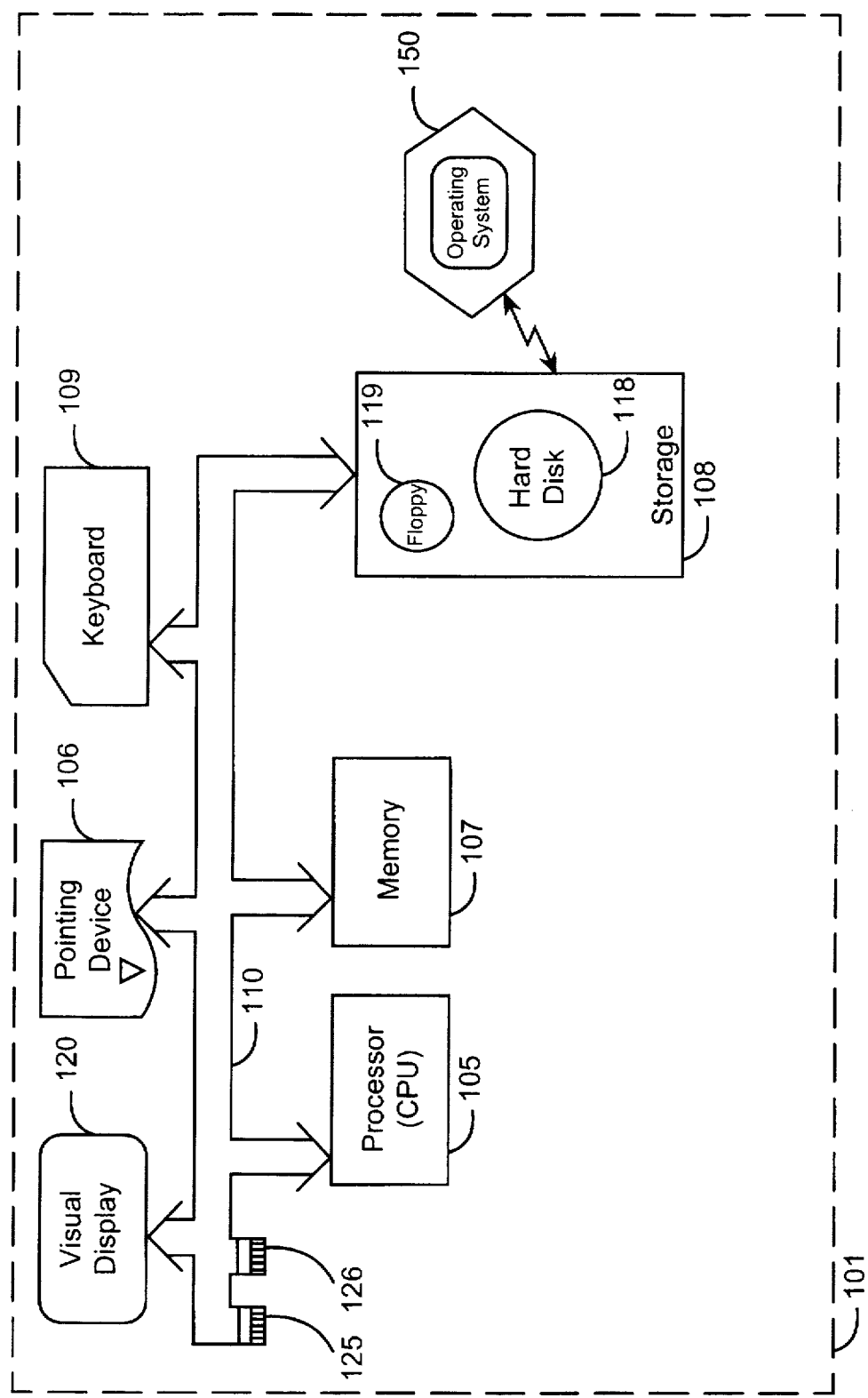
FIG. 1 is a hardware overview for an embodiment of the invention in which the operating system software is stored locally.

FIG. 1 provides an overview of the hardware of the system of the invention in a specific embodiment. Computer system 101 includes a processor or CPU 105, coupled by a bus or other interface 110 to a pointing device 106, a memory 107, a storage mechanism 108 on or in which is stored operating system software 150, a keyboard 109, and a visual display 120. Operating system software 150 or portions thereof can be loaded into memory 107 and can be executed by processor 105 upon loading, as is well known in the art. System 101 can be expanded, in particular through the installation of additional peripheral devices at communications ports 125, 126.

Processor 105 can be, for example, a microprocessor, such as the 80386, 80486 or Pentium™ microprocessor, made by Intel Corporation of Santa Clara, Calif. Pointing device 106 can be, for example, a two-dimensional pointing device such as a mouse, trackball, trackpad, stylus, 2-D or 3-D joystick or the like. Memory 107 can include, for example, random-access memory (RAM), read-only memory (ROM), virtual memory, or any other working storage medium accessible by processor 105. Storage mechanism 108 can include a hard disk 118, a floppy disk 119, an optical or magneto-optical disk (not shown), or any other persistent storage medium. Keyboard 109 can be, for example, an alphanumeric keyboard with function and cursor-control keys. Visual display 120 can be, for example, a CRT or a flat-panel display screen. Communications ports 125, 126 can be, for example, serial or parallel ports, or slots for plug-in device cards. Persons of skill in the art will appreciate that a wide range of hardware configurations can support the system and method of the present invention in various embodiments, and in particular, that multiple processors 105, pointing devices 106, hard disks 118, visual displays 120, etc., can be supported within the same specific embodiments, along with other devices or mechanisms that can be operably coupled to the processor(s) 105 via bus or interface 110.

Figure 2:
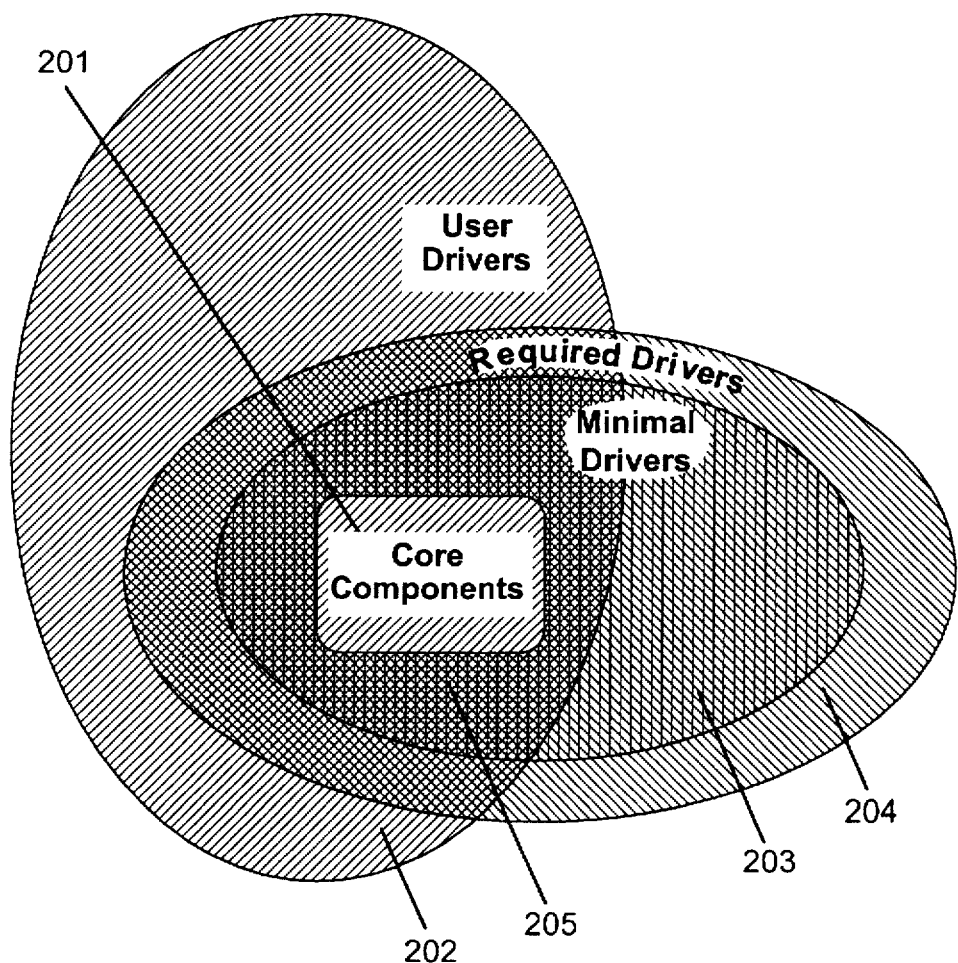
FIG. 2 is a schematic depiction of the components of the operating system software as a Venn diagram.

FIG. 2 shows operating system software 150 in more detail, in the form of a Venn diagram. Operating system software 150 includes a set of core components 201, a set of user drivers 202 that are associated with the normal mode of the system, and a set of minimal drivers 203 and required drivers 204 that together are associated with the fail-safe mode of the system. Core components 201 are used in both modes of operation. As can be seen from the diagram, there is an area of overlap 205, which indicates that some of the software associated with the minimal drivers 203 and required drivers 204 is the same software that is associated with user drivers 202. Put another way, to operate in normal mode, the computer loads core components 201 and all software associated with user drivers 202. To operate in a fail-safe mode, the computer loads core components 201, minimal drivers 203, and required drivers 204, thereby loading a subset of what normally would be loaded plus some additional software that is not used during normal operation.

In a specific embodiment, core components 201 can include a kernel, memory management software, file system software, configuration management software, and other operating system software that is essentially independent of the performance and operation of the graphical user interface aspects of operation. User drivers 202 include software drivers that allow processor 105 to control and interact with peripheral devices associated with GUI features, including driver software used in normal mode to control and interact with visual display 120. In a specific embodiment in which visual display 120 is a VGA-type display, user drivers 202 include software that emulates the hardware registers of the visual display 120 in software, thereby buffering processor 105 from direct contact with the hardware registers of visual display 120. User drivers 202 can further include, for example, software drivers for sound effect cards, SCSI (Small Computer System Interface) devices (if not used to store core components 201—see below), additional pointer devices, etc. Further, user drivers 202 include those minimal drivers 203 that are in the overlap region 205, as will be discussed shortly.

Minimal drivers 203 include software drivers for devices that are active during the limited or fail-safe mode of operation. In particular, minimal drivers 203 include a keyboard driver, a mouse driver, a hard disk driver, and a floppy disk driver in a preferred embodiment. These drivers are in the overlap region 205. Minimal drivers 203 further include a special driver for visual display 120, different from the user driver for the visual display that was discussed previously in connection with user drivers 202. This special driver can be a driver for a standard VGA-type display, and more particularly, a standard VGA driver in which the processor 105 directly addresses the hardware registers of the VGA device.

Generally, the minimal drivers 203 are chosen for their high reliability. Proven, time-tested software is preferred. Whereas user drivers 202 not in the overlap region 205 can be specific to the user's particular computer system and its hardware configuration, minimal drivers 203 are generic, so that they can work reliably with a wide variety of computer systems and hardware configurations.

Required drivers 204 are software drivers beyond those needed for a minimal working system. Whereas minimal drivers 203 preferably provide only the device drivers essential to the operation of the computer, required drivers 204 include software drivers for hardware components by which core components of operating system software 150 (such as, for example, some of the core components 201) are accessed in the particular system at hand. For example, required drivers 204 can include a driver or drivers for networking hardware in a system in which operating system software 150 is accessible to processor 105 only or primarily via a network (as discussed more fully in connection with FIG. 6 below). As another example, required drivers 204 can include drivers for a PCMCIA card reader, an optical disk drive, or a SCSI-based disk drive if these devices are used to store core components 201 of operating system software 150 in the particular computer system. Like minimal drivers 203, required drivers 204 can include both software that is used in normal mode and is included among user drivers 202, as represented by the overlap area 205, as well as special software that is not used except in the fail-safe mode. In some embodiments, required drivers 204 are omitted, or can be omitted at the user's option.

Ordinarily, the contents of the set of minimal drivers 203 and the set of required drivers 204 is predetermined by the designers of operating system software 150. In some embodiments, a system file that is part of operating system software 150 determines the contents of the set of minimal drivers 203. In such embodiments, the set of minimal drivers 203 can be modified by the (sophisticated) user through modification of this system file. In other embodiments, the contents of the set of minimal drivers 203 can be selectively augmented by the user during the loading of the operating system in fail-safe mode, for example, by interactive stepwise execution of a batch file that provides for the inclusion of additional devices such as a CD-ROM drive.

Figure 3:
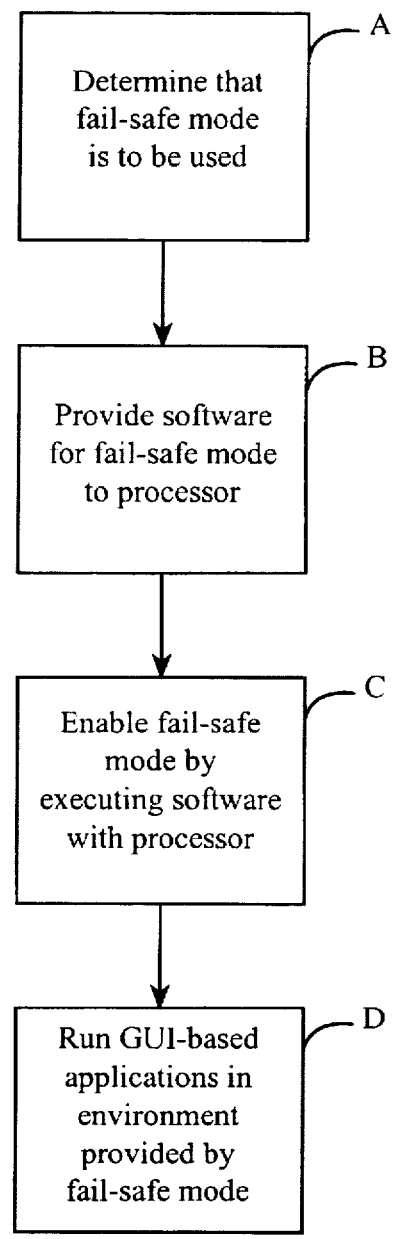
FIG. 3 is a flowchart depicting the high-level steps of the method of the invention.

FIG. 3 is a flowchart showing the basic steps in the method of the invention in the specific embodiment. First, processor 105 determines that the fail-safe mode of the operating system is to be used (Step A). Next, the software 201, 203, 204 that processor 105 needs to effect this mode is provided to processor 105 (Step B). Thereafter, processor 105 executes the software thus provided to enable the operating system in fail-safe mode (Step C). Finally, processor 105 can be used to run graphical user interface-based applications programs in the context provided by the fail-safe mode of the operating system. In particular, when such applications require that processor 105 interact with hardware devices such as visual display 120, the software routines that processor 105 uses to effect such interaction are drawn from minimal drivers 203 and required drivers 204.

Figure 4:
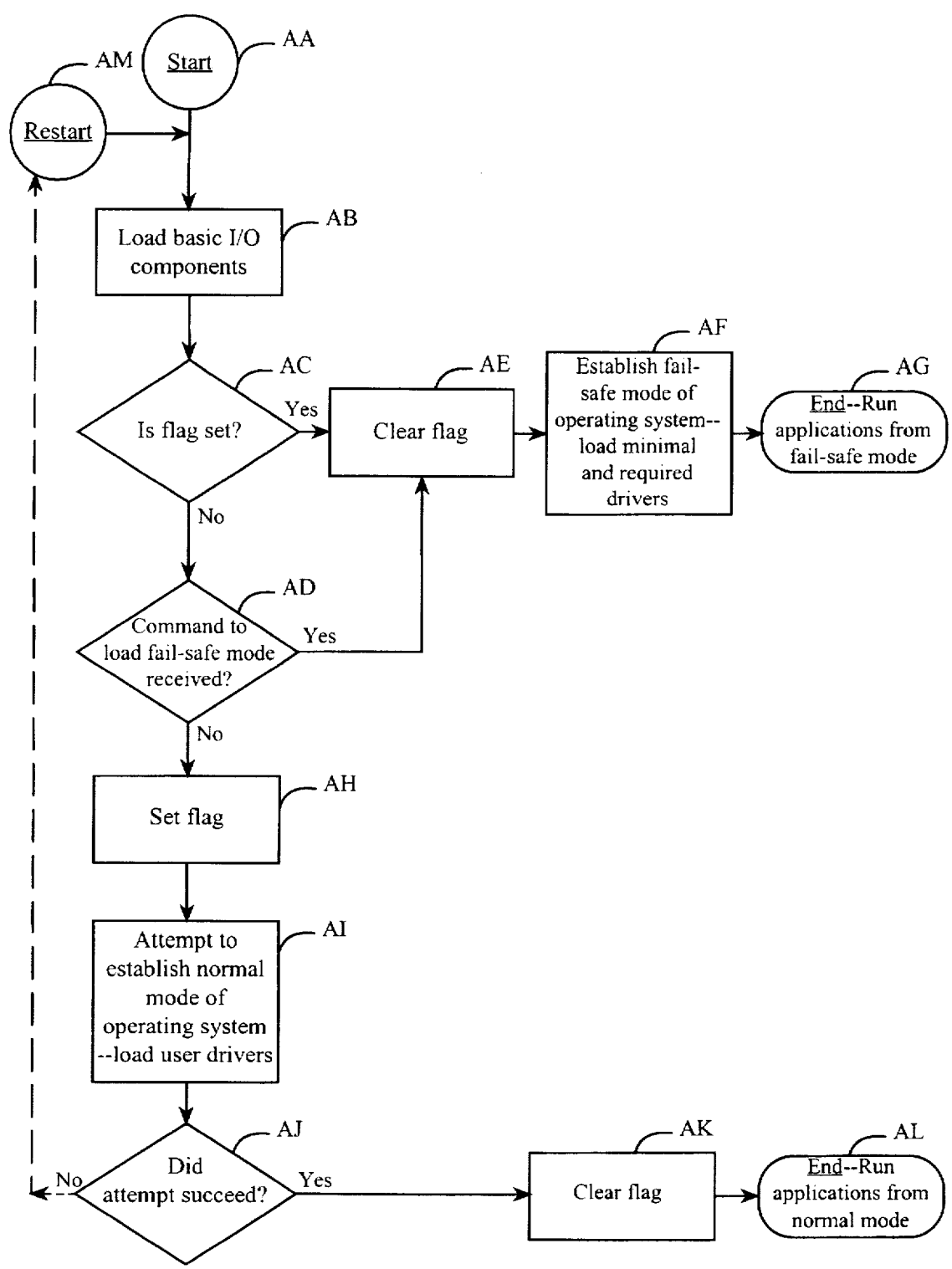
FIG. 4 is a more detailed flowchart elaborating the steps of determining whether to use the fail-safe mode of the operating system and loading the fail-safe mode in an embodiment in which the operating system software is stored locally.

FIG. 4 is a flowchart that expands upon steps A and B of FIG. 3. In particular, the steps AB and AE of FIG. 4 as described below correspond to the providing step B of FIG. 3 in this embodiment.

First, the computer system 101 is started up (Step AA). Next, basic input-output components of the operating system are loaded (Step AB), for example, into portions of memory 107. The basic input-output components are a subset of core components 201 sufficient to enable processor 105 to check the special flag (in Step AC, below). They can include, for example, components to access storage mechanism 108.

Next, processor 105 determines whether a special flag is set (Step AC). This flag indicates whether fail-safe mode is to be established in response to a previous failure of an attempt to establish normal mode. The flag can be stored, for example, using storage mechanism 108. If the flag is set, fail-safe mode will be established (execution continues at Step AE).

If the special flag is not set, processor 105 determines whether a specific command to load the fail-safe mode was received (Step AD). Such a command can be issued manually by the user, for example, by pressing a designated key on keyboard 109 (such as function key F8) prior to or during the loading sequence, or in some embodiments can be issued by a scripting file or the like.

If either the flag is set (Step AC) or a command to load the fail-safe mode was received (Step AD), the flag is cleared (Step AE), and minimal drivers 203 and required drivers 204 are loaded along with any of the core components 201 not already loaded as basic input-output components (Step AF). Thereafter, applications programs can be executed with the limited functionality provided by the minimal and required drivers (Step AG).

If the flag is not set (Step AC) and no command to load the fail-safe mode was received (Step AD), the flag is set (Step AH) as a precaution, and an attempt is made to establish the normal mode of the operating system by loading user drivers 202 and any core components 201 not already loaded (Step AI). If this attempt completes successfully (Step AJ), the flag is cleared (Step AK) and applications programs can be executed from the normal mode (Step AL).

If the attempt to establish the normal mode fails (Step AJ), the system will be restarted, either automatically or by the user. Upon restart (Step AM), the basic inputoutput components are reloaded (Step SB) to ensure their integrity. Thereafter, when the special flag is tested (Step AC), it is found to have been set. Accordingly, the flag is cleared (Step AE), and the fail-safe mode is established by loading the minimal and required drivers and those core components not already loaded (Step AF).

Figure 5A:
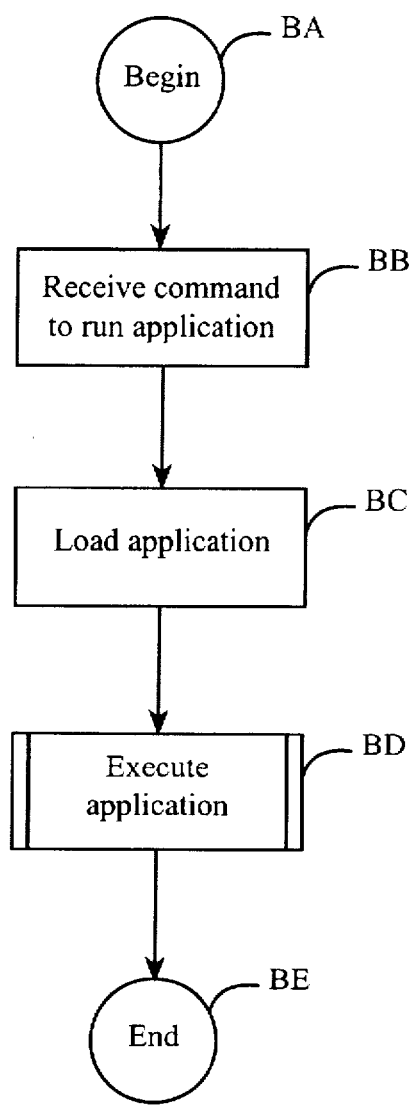
FIGS. 5A–5C are more detailed flowcharts that elaborate the steps of executing an applications program from the fail-safe mode of the operating system.
Figure 5B:
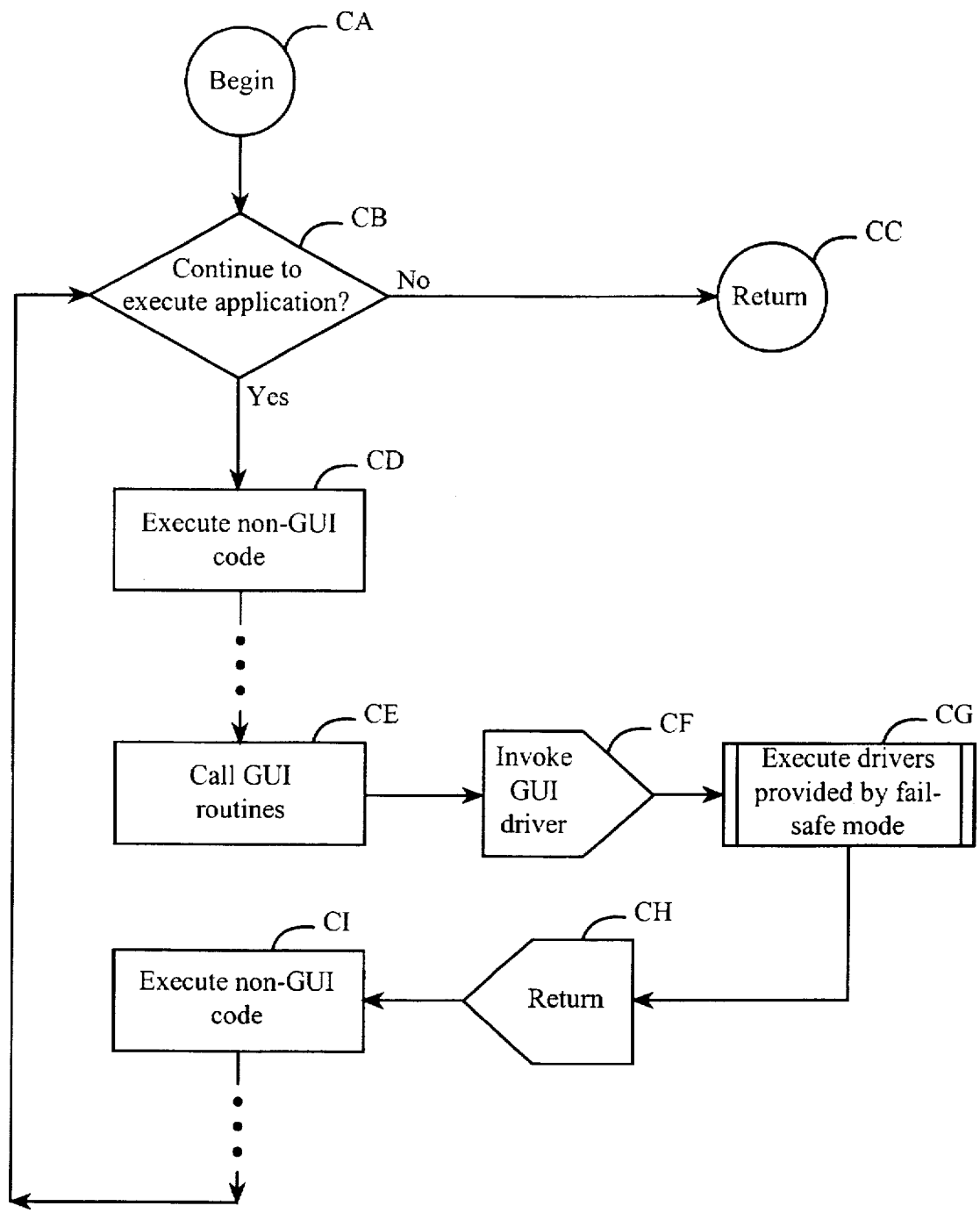
Figure 5C:
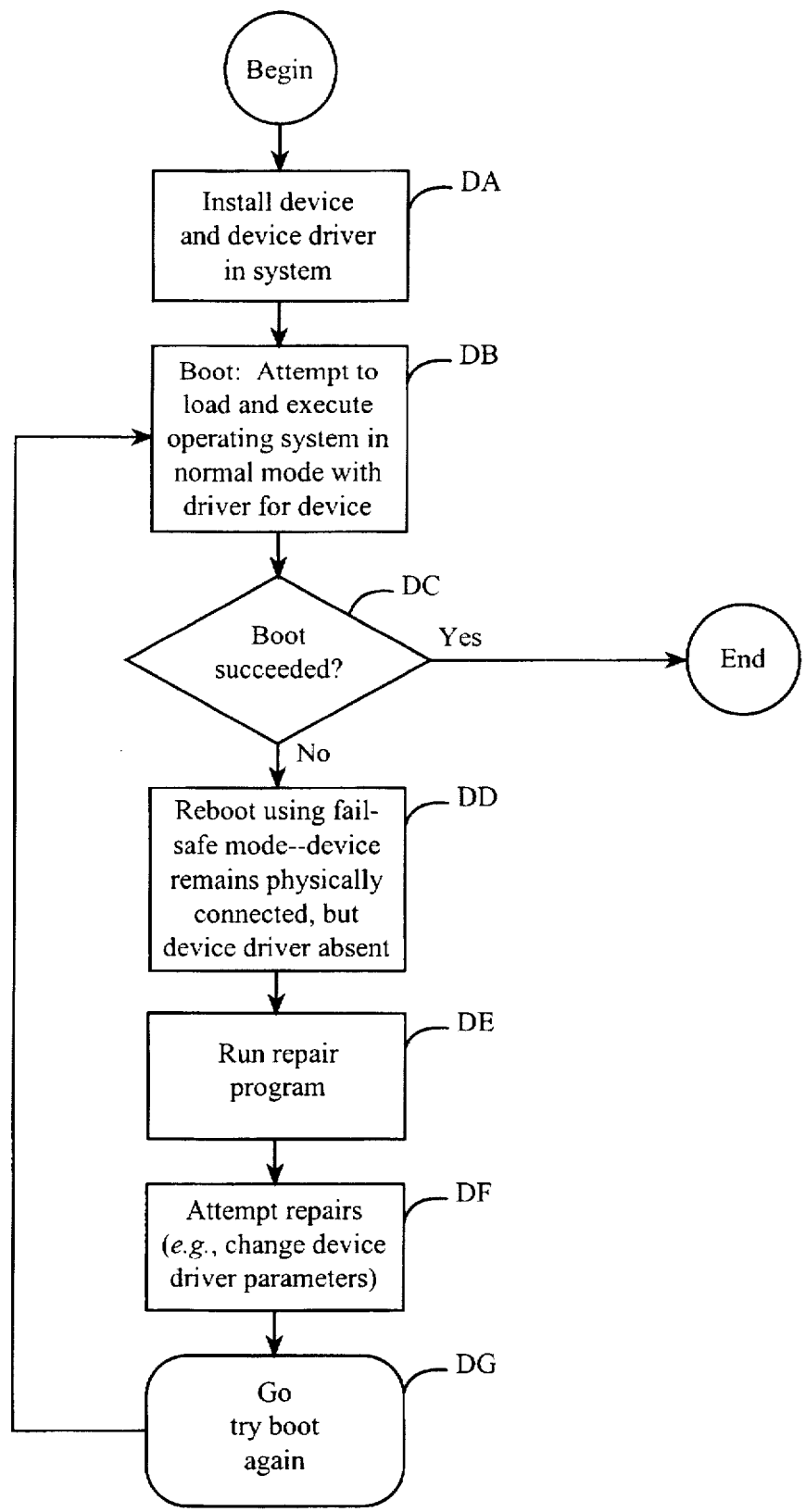

FIGS. 5A–5C expand upon the flowchart steps C and D of FIG. 3. FIG. 5A illustrates the steps involved in running an applications program from the fail-safe mode of the operating system in a specific embodiment. After the operating system has been enabled in fail-safe mode (Step BA), a command can be received to run an applications program (Step BB). Processor 105 responds by loading the applications program as requested (Step BC). The command of step BB can be issued from the keyboard, the mouse, or other user input device, or in some embodiments from a scripting file or the like. The applications program loaded in step BC can be a debugger, diagnostic program, repair program, or a general purpose applications program, such as a word processor or a spreadsheet. Once the applications program is loaded, it is invoked by executing its software (Step BD). Execution continues until the program terminates normally or abnormally (Step BE).

The process of invoking the applications program (Step BD) is illustrated in more detail in FIG. 5B. Upon invocation of the program, execution of the applications program by processor 105 begins (Step CA). A test is made to determine whether execution of the application should continue (Step CB). If not, the execution or the applications program is complete and control returns to the operating system (Step CC). Otherwise, program execution continues. This can involve the execution of code not associated with the graphical user interface (Step CD), followed by calls to the graphical user interface routines (Step CE). Such calls invoke the driver software needed to effect communication between processor 105 and hardware devices such as visual display 120. When a driver is called (Step CF), this causes processor 105 to execute driver software from the minimal drivers 203 and required drivers 204, because the fail-safe mode of operation is active (Step CG). Once the driver routines are complete, control returns (Step CH) to the main line of the applications program and additional code not associated with the graphical user interface can be executed (Step CI). Execution then continues in a loop until such time or event transpires as causes the applications program to terminate (Step CB).

The applications program illustrated in FIG. 5B is merely one example of the myriad applications programs that can be executed within the context provided by the "fail-safe" mode of operation according to the present invention. Persons of skill in the art will readily appreciate other possibilities in this regard.

FIG. 5C shows how the invention can be used to solve the problem of a system crash encountered upon installation of a new peripheral device in system 101. The user installs the device by physically connecting it to system 101, for example by way of port 125 or port 126, and further by running an installation program to install its driver software, for example in operating system 150 (Step DA). The next time that the user turns on the computer, the system attempts a normal bootstrap load (Step DB). If the load sequence succeeds so that operating system 150 can run normally (Step DC), all is well. If not, however, the system reboots using the fail-safe mode (Step DD). The driver for the newly installed device is not activated in fail-safe mode, as it belongs neither to the set of minimal drivers 203 nor to the set of required drivers 204. Once the operating system is up and running in fail-safe mode, the user invokes a repair program (Step DE), such as a GUI-based file editor or system resource configuration utility, to modify the configuration of the driver for the new device (Step DF), for example by altering the parameters used by the driver. Thereafter, the user issues a command to reboot the system (Step DG). The user can repeatedly modify the driver configuration and reboot until operating system 150 successfully loads in normal mode.

A Networked Embodiment

Figure 6:
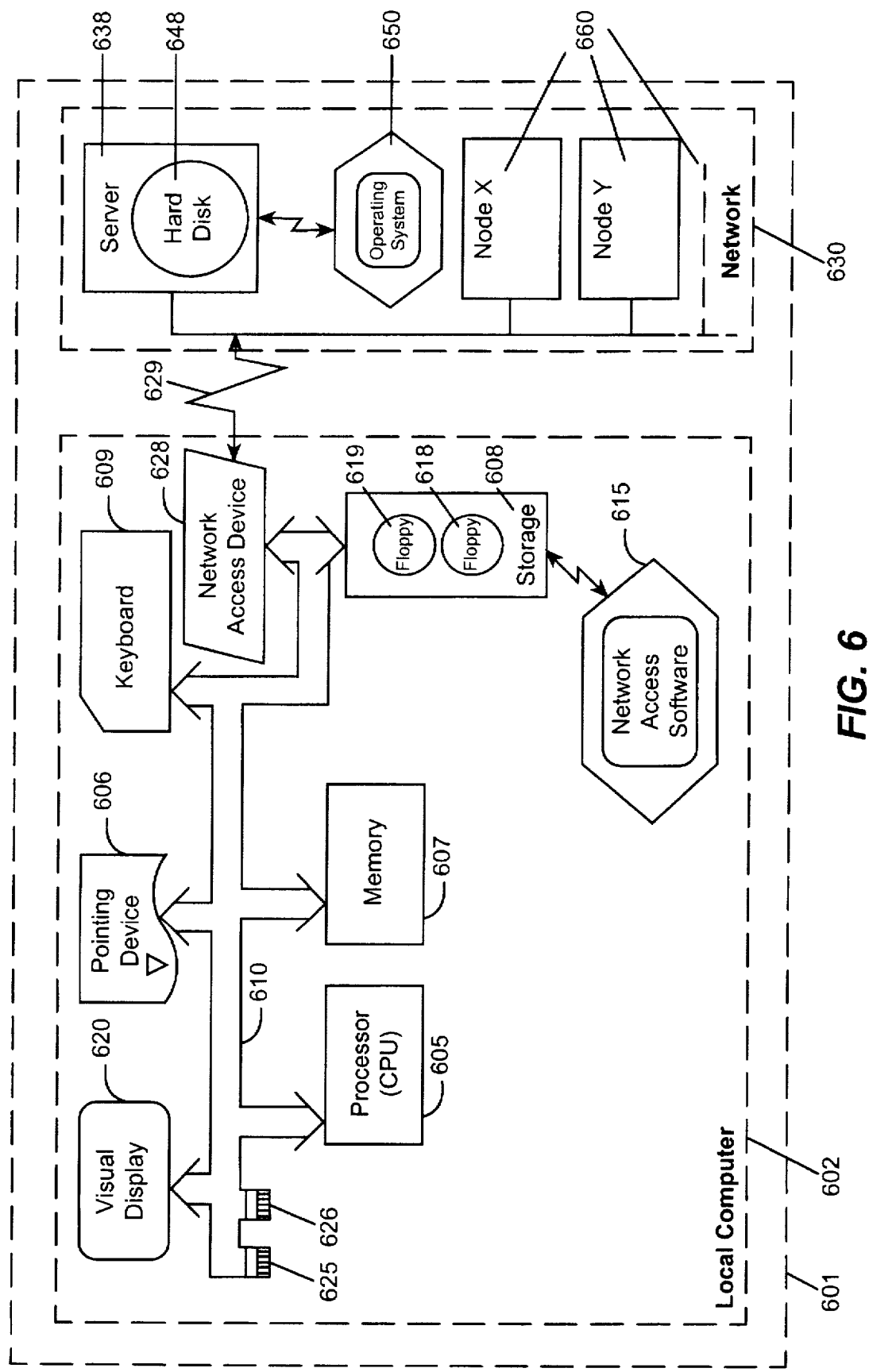
FIG. 6 is a hardware overview for an embodiment of the invention in which the operating system software is accessed across a network.

FIG. 6 illustrates the hardware of a system in a specific embodiment of the invention in which the operating system software is furnished to the processor via a network. System 601 includes a local computer 602 connected to a network 630 by a communications pathway 629. Local computer 602 includes a processor (CPU) 605, a pointing device 606 a memory 607, a local storage mechanism 608 in which is stored network access software 615 that processor 605 can use in accessing network 630, a keyboard 609, a visual display 620, communication ports 625, 626 (e.g., serial or parallel ports), and a network access device 628 which can include a network interface card installed in computer 602. Local bus or interface 610 connects processor 605 with the other components of computer 602. (In some embodiments, network access software 615 is not stored in local storage 608, but instead is stored in a special read-only memory that can be included as part of network access device 628.)

Local storage 608 can be limited in storage capacity so that it lacks sufficient capacity to store the entire operating system software at once. For example, if computer 602 is a personal computer, processor 605 is a microprocessor, input device 606 is a computer keyboard, visual display 620 is a CRT, and network access device 628 includes a port to a local area network or a high-speed connection to a wide area network (depending on whether network 630 is a local area or wide area network, respectively), then local storage 608 can include, for example, two floppy disk drives 618, 619.

The hardware of communications pathway 629 depends on whether network 630 is a local area or wide area network. If network 630 is a local area network, communications pathway 629 can include, for example, a coaxial cable or fiber-optic cable installed to support the local area network. If network 630 is a wide area network, communications pathway 629 can include, for example, a wired or wireless telephone or other telecommunication system.

Network 630 can include numerous devices linked together so as to communicate with one another. Such devices can include, for example, additional computing nodes 660 and other devices (not shown). In this specific embodiment, network 630 includes a server 638. Server 638 is a computer, typically one with significantly greater processing power than local computer 602. Server 638 has a hard disk 648 that stores operating system software 650.

For processor 605 to run operating system software 650, it must first communicate with the network 630 via communications port 628 and communications pathway 629. Put another way, computer 602 lacks its own full-fledged operating system, and must get its operating system via communications pathway 629 from network 630 and, more particularly, from server 638. In this embodiment, then, network access software 615 includes the required drivers 204. Required drivers 204 depend on the hardware of computer 602 and, in particular, on the specifications of network access device 628, as well as on the communications protocols used by network 630. Network access software 615 can further include a limited subset of operating system software 650, for example, certain of the core components 201 and minimal drivers 203, as may be needed to establish and maintain communications between computer 602 and network 630 (and in particular, with server 638) and to provide a modicum of display capability for status and error messages that can be generated during the process of accessing network 630.

FIGS. 3, 5A, 5B and 5C apply equally to the specific embodiment of FIG. 6 as to the specific embodiment of FIG. 1. FIG. 4, however, requires some modification, as will be shown next.

Figure 7:
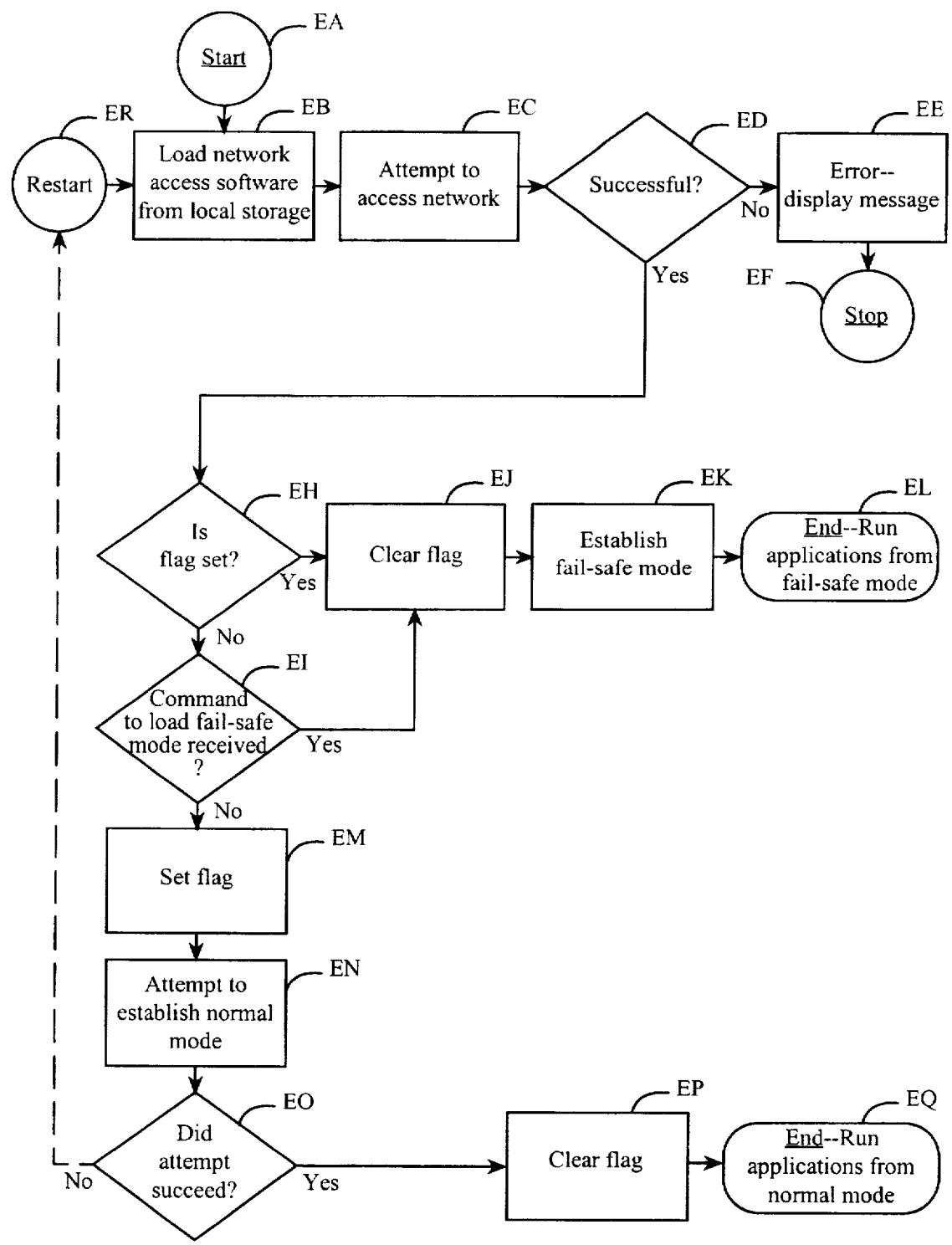
FIG. 7 is a flowchart elaborating the steps of determining whether to use the fail-safe mode of the operating system and loading the fail-safe mode in an embodiment in which the operating system software is accessed across a network.

Referring now to FIG. 7, when computer 602 is started up (Step EA), network access software 615 is loaded into memory 607 from local storage 608 (or, in some embodiments, from a special read-only memory in network access device 628) so as to be available for execution by processor 605 (Step EB). The processor 605 executes the software and attempts to access network 630 (Step EC). A test is made to determine whether the attempt to access the network has succeeded (Step ED). If not, the operating system cannot be loaded. An error message can be displayed in visual display 620 (Step EE) and thereafter, execution stops (Step EF).

If the attempt to access the network has succeeded, loading of the operating system begins. A test is made to see whether a special flag is set (Step EH). This flag, which can be stored by server 638, indicates whether fail-safe mode is to be established in response to a previous failure of an attempt to establish normal mode. If the flag is set, fail-safe mode will be established (execution continues at Step EJ). If the special flag is not set, a determination is made whether a specific command to load the fail-safe mode has issued from the local computer 602 (Step EI). If either the flag is set or a command to load the fail-safe mode has issued, the flag is cleared (Step EJ), and the fail-safe mode is established by loading the appropriate routines from the server 638 (Step EK). Applications programs can then be executed from fail-safe mode (Step EL).

If the flag is not set and no command to load the fail-safe mode has issued, the flag is set (Step EM) as a precaution, and an attempt is made to establish the normal mode of the operating system (Step EN). If this attempt completes successfully (Step EO), the flag is cleared (Step EP) and applications programs can be executed from the normal mode (Step EQ).

If the attempt to establish normal mode fails, the loading sequence can be restarted (Step ER). This causes the network to be reaccessed (Steps EB, EC, and ED) and, because the special flag is set (Step EH), further causes the flag to be cleared (Step EJ) and fail-safe mode to be established (Step EK). Applications programs can be executed from the fail-safe mode (Step EL).

The foregoing specific embodiments represent just some of the ways of practicing the present invention. Many others are possible. For example, the method and system of the invention can be applied to automate the restarting of many kinds of computer operating systems, such as graphical user interface-based operating systems for minicomputers, mainframes, or supercomputers. Also, the invention can be used in contexts beyond traditional computer systems, for example, as in a graphical-based "set-top box" for controlling delivery of interactive cable television programming to a user's television. Accordingly, the scope of the invention is not limited to the foregoing specification, but instead is given by the following claims along with their full range of equivalents.

We claim:

1. In a system comprising a processor, an input device operatively coupled to the processor, a visual display operatively coupled to the processor, an information storage mechanism operatively coupled to the processor, and software executable by the processor for governing operation of the system, a method of operating the system to emulate failure recovery, the method comprising the steps of:

receiving into the system an input from the input device;

responsively to the input received, deciding with the processor to bypass a normal mode of operation of the system, the normal mode providing the system with a first set of graphical user interface capabilities, and to establish a failure-recovery mode of operation of the system in lieu of the normal mode, the failure-recovery mode providing the system with a second set of graphical user interface capabilities, the second set including a subset of the first set of graphical user interface capabilities;

establishing the failure-recovery mode of operation of the system by loading with the processor, in conjunction with the information storage mechanism, a second configuration of the software for execution by the processor; and executing software of the second configuration with the processor to provide the system with a graphical user interface capability of the second set.

2. The method of claim 1 further including the step of initializing the operating system, and wherein the receiving step occurs during the performance of the initializing step.

3. The method of claim 1 wherein the first set of graphical user interface capabilities includes a high-performance video driver used in the normal operating mode, and wherein the second set of graphical user interface capabilities includes a second video driver that executes more reliably than the high-performance video driver, and wherein the bypassing step includes the step of executing the second video driver rather than the high-performance video driver.

4. A method in a computer system having an input device and an operating system, the method for emulating a failure recovery process based upon input from the input device, the method comprising the steps of:

receiving input from the input device; and in response to the receiving step, bypassing a normal operating mode of the operating system that provides a first set of user interface capabilities in order to establish a failure-recovery operating mode of the operating system that provides a second set of user interface capabilities, the second set of user interface capabilities comprising a proper subset of the first set of user interface capabilities, by executing a failure-recovery configuration of the operating system corresponding to the failure-recovery operating mode of the operating system.

5. The method of claim 4 further including the step of initializing the operating system, and wherein the receiving step occurs during the performance of the initializing step.

6. The method of claim 4 wherein the first set of user interface capabilities includes a first video driver used in the normal operating mode, and wherein the second set of user interface capabilities includes a second video driver distinct from the first video driver, and wherein the bypassing step includes the step of executing the second video driver rather than the first video driver.

7. The method of claim 4 wherein the first set of user interface capabilities includes a first audio driver used in the normal operating mode, and wherein the second set of user interface capabilities includes a second audio driver distinct from the first audio driver, and wherein the bypassing step includes the step of executing the second audio driver rather than the first audio driver.

8. A computer-readable medium for causing a computer system having an input device and an operating system to emulate a failure recovery process based upon input from the input device by performing the steps of:

receiving input from the input device; and in response to the receiving step, bypassing a normal operating mode of the operating system that provides a first set of user interface capabilities in order to establish a failure-recovery operating mode of the operating system that provides a second set of user interface capabilities, the second set of user interface capabilities comprising a proper subset of the first set of user interface capabilities, by executing a failure-recovery configuration of the operating system corresponding to the failure-recovery operating mode of the operating system.

9. The computer-readable medium of claim 8 wherein the contents of the computer-readable-medium further cause the computer system to perform the step of initializing the operating system, and wherein the receiving step occurs during the performance of the initializing step.

10. The computer-readable medium of claim 8 wherein the first set of user interface capabilities includes a first video driver used in the normal operating mode, and wherein the second set of user interface capabilities includes a second video driver distinct from the first video driver, and wherein the bypassing step includes the step of executing the second video driver rather than the first video driver.

11. The computer-readable medium of claim 8 wherein the first set of user interface capabilities includes a first audio driver used in the normal operating mode, and wherein the second set of user interface capabilities includes a second audio driver distinct from the first audio driver, and wherein the bypassing step includes the step of executing the second audio driver rather than the first audio driver.

12. A computer system having an input device and an operating system that emulates a failure recovery process based upon input from the input device, comprising:

an input device for receiving user input; and a processor for executing the operating system and, when the input device receives selected user input, bypassing a normal operating mode of the operating system that provides a first set of user interface capabilities in order to establish a failure-recovery operating mode of the operating system that provides a second set of user interface capabilities, the second set of user interface capabilities comprising a proper subset of the first set of user interface capabilities, by executing a failure-recovery configuration of the operating system corresponding to the failure-recovery operating mode of the operating system.

* * * * *